(12) United States Patent
Nonaka (10) Patent No.: US 7,956,750 B2
(45) Date of Patent: Jun. 7, 2011

(54) WIRELESS IC TAG

(75) Inventor: Nobuyuki Nonaka, Koto-ku (JP)

(73) Assignees: Universal Entertainment Corporation, Tokyo (JP); Seta Corp., Tokyo (JP)

( * ) Notice: Subject to any disclaimer, the term of this patent is extended or adjusted under 35 U.S.C. 154(b) by 273 days.

(21) Appl. No.: 12/295,654

(22) PCT Filed: Mar. 30, 2007

(86) PCT No.: PCT/JP2007/057168
§ 371 (c)(1), (2), (4) Date: Oct. 1, 2008

(87) PCT Pub. No.: WO2007/116830
PCT Pub. Date: Oct. 18, 2007

(65) Prior Publication Data
US 2009/0273474 A1     Nov. 5, 2009

(30) Foreign Application Priority Data

Apr. 3, 2006 (JP) ................................. 2006-101883

(51) Int. Cl.
*G08B 13/14* (2006.01)

(52) U.S. Cl. ............... 340/572.5; 340/572.7; 340/572.8; 340/10.1; 340/10.51; 343/742; 343/834; 343/867; 342/42; 342/51

(58) Field of Classification Search ............. 340/572.5, 340/572.7, 572.8, 10.1, 10.51; 343/742, 343/834, 867; 342/42, 51
See application file for complete search history.

(56) References Cited

U.S. PATENT DOCUMENTS

| | | | |
|---|---|---|---|
| 4,495,503 A * | 1/1985 | Morman | 343/746 |
| 7,323,977 B2 * | 1/2008 | Kodukula et al. | 340/505 |
| 7,482,934 B2 * | 1/2009 | Nakamura et al. | 340/572.8 |
| 2003/0169153 A1 | 9/2003 | Muller | |

FOREIGN PATENT DOCUMENTS

| | | |
|---|---|---|
| JP | 2 8772 | 1/1990 |
| JP | 8 263609 | 10/1996 |
| JP | 10 105660 | 4/1998 |
| JP | 11 31201 | 2/1999 |
| JP | 2002 298106 | 10/2002 |
| JP | 2003 271913 | 9/2003 |
| JP | 2003 529163 | 9/2003 |
| JP | 2004 287942 | 10/2004 |

* cited by examiner

*Primary Examiner* — Tai T Nguyen
(74) *Attorney, Agent, or Firm* — Oblon, Spivak, McClelland, Maier & Neustadt, L.L.P.

(57) ABSTRACT

To provide a wireless IC tag which is readable even in a plurality of countries (destination countries) using different radio frequency bands for reading.
The wireless IC tag of the present invention is characterized by comprising: a case (20); an antenna (60), which is provided in the case (20); a metal plate (901), which is disposed in the case opposite to the antenna (60); and a mechanism for altering the resonance characteristics of the wireless IC tag (10) by moving at least one of the antenna (60) and the metal plate (901) in the case (20), thereby altering the distance (D) between the metal plate (901) and the antenna (60). With such wireless IC tag (10), the capacitance of an equivalent tuning capacitor consisting of the antenna (60) and the metal plate (901) can be arbitrarily altered by a distance alteration unit, and thereby, the resonance characteristics of the wireless IC tag (10) can be altered in accordance with the frequency band of reading radio wave used by a reader/writer.

13 Claims, 6 Drawing Sheets

WIRELESS IC TAG

TECHNICAL FIELD

The present invention relates to a wireless IC tag, and more particularly, to a wireless IC tag which is readable even by radio waves for reading, in a plurality of different frequency bands.

BACKGROUND ART

As a radio communication unit, wireless IC tags for updating information between the IC tag and a reader device become widespread and prosperous. The important usages of the wireless IC tags include logistics such as product inventory management or container and pallet management. In other words, the utilization of wireless IC tags for tracking and managing a material transportation status by attaching the wireless IC tags to management objects such as materials is under consideration. On the other hand, transportation of materials is actively underway multi-nationally owing to activization of trades or internationalization of company activities, etc.

In general, such wireless IC tags are made up of IC chips and antennas which are capable of storing information. The wireless IC tags can transmit/receive data to/from a device referred to as a reader/writer, by means of radio waves (Patent Document 1, for instance). Among them, in particular, a wireless IC tag, which uses a radio wave frequency of 300 MHz or more and does not have a power source incorporated therein, is deemed to be suitable for usages of replacement of bar codes, etc., because of its long communicable distance with the reader/writer and its comparatively low price (Patent Document 2, for instance).

As to radio waves used for communication with the wireless IC tag and the reader/writer, the greater transmission power is, the longer communication distance between the wireless IC tag and the reader/writer is. Further, the lower communication frequency is, the smaller propagation loss in air is, and therefore, the longer communication distance is. With respect to frequencies of available radio waves and their output levels, however, the limits defined on a country-by-country basis are present, and, among the limits defined in countries, a frequency and transmission power are selected such that the maximum effect is attained, and a communication system between the wireless IC tag and the reader/writer is designed. In the wireless IC tags, antennas are designed so as to obtain impedance characteristics and resonance characteristics responsive to the limits determined in countries. In conventional wireless IC tags, therefore, matching is attempted in only one frequency band, communication with the reader/writer employing another frequency band is impossible and difficult, and a problem arises with reading precision of the wireless IC tag.

Patent Document 1: Japanese Patent No. 2553641
Patent Document 2: Japanese Patent Application Laid-open No. 2002-298106

DISCLOSURE OF THE INVENTION

Problem(s) to be Solved by the Invention

As described above, in general, wireless IC tags are given antennas having resonance characteristics responsive to radio frequencies for reading. Because of this, in radio waves for reading in a frequency band which does not accord with the resonance frequencies of antennas, reading of the wireless IC tags is impossible.

If the wireless IC tags are employed for usage of managing international material distribution, different radio frequency bands for reading are occasionally assigned to a reader device (a reader/writer) of the wireless IC tag on a country-by-country basis, and therefore, the wireless IC tags must be reattached or replaced with the replacement tags in accordance with the radio frequency band for reading in the country, and, if materials are moved from one country to another, reattachment of the wireless IC tags and discarding of the removed wireless IC tags must be performed. Such reattaching and discarding of the wireless IC tags are not preferable from the viewpoints of saving in resources, cost reduction, and errors that might occur at the time of reattachment or the like.

An object of the present invention is to provide a wireless IC tag which is readable in a plurality of countries (destination countries) with different radio frequency bands for reading.

Means for Solving the Problem(s)

As a means for solving the above-described problem, the present invention has the following features. A first aspect of the present invention is proposed as a wireless IC tag employed while it is mounted to a metal object.

This wireless IC tag is characterized by comprising: a case; an antenna, which is movably provided in the case; and a distance alteration unit (a movement mechanism, for instance) for altering resonance characteristics of the wireless IC tag by moving the antenna in the case and altering a distance between the metal object and the antenna.

According to such wireless IC tags, the capacitance of an equivalent tuning capacitor, which is made up of an antenna and a metal object, can be arbitrarily altered by the distance alteration unit, thus making it possible to alter the resonance characteristics of the wireless IC tag in accordance with the frequency bands of the radio waves for reading, which the reader/writer uses, and, as the result thereof, a wireless IC tag, which is readable even by any reader/writer, is provided.

In this wireless IC tag, the distance alteration unit may serve to alter the distance between the metal object and the antenna so as to obtain resonance characteristics suitable for any of the plurality of different frequency bands. With such wireless IC tag, a user can alter the resonance characteristics of the wireless IC tag in accordance with the limit (a radio frequency band) in a destination country and can eliminate a need to replace the wireless IC tag with the replacement tag in accordance with the destination country.

The abovementioned wireless IC tag may further have an indication (a country indication such as Japan, USA, and Europe, for instance) corresponding to a plurality of different frequency bands, for setting the distance between the metal object and the antenna suitable for a respective one of the plurality of different frequency bands. With such indication being a standard, the user can speedily and readily alter the resonance characteristics of the wireless IC tag in accordance with the limit (a radio frequency band) in the destination country.

A second aspect of the present invention is characterized by comprising: a case; an antenna provided in the case; a metal object (for instance, a metal plate portion), which is disposed opposite to the antenna and is provided in the case; and a distance alteration unit (for instance, a movement mechanism) for altering the resonance characteristics of the wireless IC tag by altering a distance between the metal object and the antenna.

According to such wireless IC tag, the capacitance of an equivalent tuning capacitor, which is made up of an antenna and a metal object, can be arbitrarily altered by the distance alteration unit, thus making it possible to alter the resonance characteristics of the wireless IC tag in accordance with the radio frequency bands for reading, which the reader/writer uses, and, as the result thereof, a wireless IC tag, which is readable even by any reader/writer, is provided.

In the abovementioned wireless IC tag, the distance alteration unit may alter the distance between the metal object and the antenna so as to obtain the resonance characteristics suitable for any of the plurality of frequency bands in response to the user's operation. With such wireless IC tag, the user can alter the resonance characteristics of the wireless IC tag in accordance with the limit (a radio frequency band) in a destination country and can eliminate a need to replace the wireless IC tag with the replacement tag in accordance with the destination country.

The abovementioned wireless IC tag may further have an indication (a country indication such as Japan, US, and Europe, for instance) corresponding to a plurality of different frequency bands, for setting the distance between the metal object and the antenna suitable for a respective one of the plurality of different frequency bands. With such indication being a standard, the user can speedily and readily alter the resonance characteristics of the wireless IC tag in accordance with the limit (a radio frequency band) in the destination country.

A third aspect of the present invention is proposed as a wireless IC tag which is capable of replacing a metal object with the replacement object.

This wireless IC tag is characterized by comprising: a case; an antenna, which is provided in the case; and a metal object, which is mounted on an external face of the case so as to be opposite to the antenna and which is replaceable so as to obtain resonance characteristics suitable for any of a plurality of different frequency bands.

According to such wireless IC tag, the capacitance of an equivalent tuning capacitor, which is made up of an antenna and a metal object, can be arbitrarily altered by the distance alteration unit, thus making it possible to alter the resonance characteristics of the wireless IC tag in accordance with the frequency bands of the radio waves for reading, which the reader/writer uses, and, as the result thereof, a wireless IC tag, which is readable even by any reader/writer, is provided.

The metal objects may be different from each other in at least one of an area, thickness, quality of material, and a shape, so as to obtain resonance characteristics suitable for any of a plurality of different frequency bands.

ADVANTAGEOUS EFFECT(S) OF THE INVENTION

According to the present invention, a wireless IC tag can be provided which is readable in a case where radio frequency bands for reading are used under different environmental conditions, for instance, in a case where materials are transported between a plurality of countries (destination countries).

REFERENCE NUMERALS

10 . . . Wireless IC tag
20 . . . Case
30 . . . Main body
40 . . . Movement mechanism
50 . . . IC device
60 . . . Antenna
900 . . . Metal plate portion
1001A to 1001C . . . Metal plates

BEST MODE FOR CARRYING OUT THE INVENTION

A. First Embodiment

Hereinafter, a first embodiment of the present invention will be described with referring to the drawings.

[A.1. Basic Structure]

Figure 1:
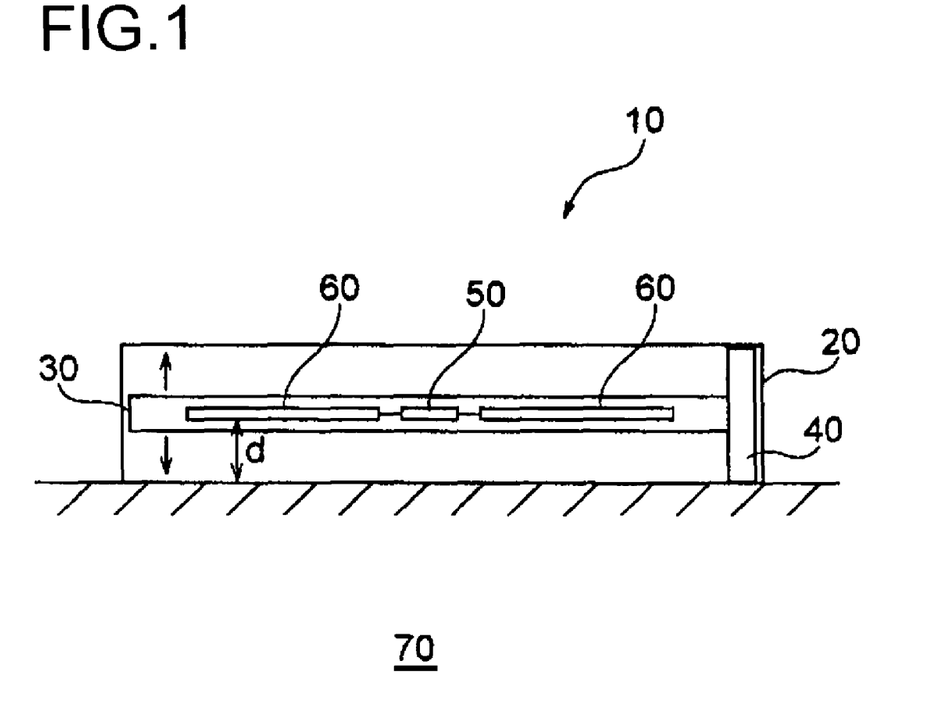
FIG. 1 is a view showing a basic configuration of a wireless IC tag according to a first embodiment.

FIG. 1 is a view showing a basic configuration of a wireless IC tag according to the embodiment. A wireless IC tag 10 according to the embodiment, shown in FIG. 1, is a so called "On-Metal" wireless IC tag which is readable even if it is attached to a metal.

The wireless IC tag 10 is made up of: a case 20 formed in a substantially box-like shape; a main body (a retainer) 30, which is provided movably in a vertical direction (in a substantially vertical direction relative to a mounting face) inside of the case 20; and a movement mechanism (distance alteration unit) 40 for vertically moving the main body 30 in the case 20. The main body 30 has: an IC device 50; and an antenna 60 which is connected to this IC device 50. The wireless IC tag 10 is attached to a metal object 70 by means of an adhesive seal or the like (not shown) so as not to be readily released therefrom.

The case 20 and the main body 30 are members molded with a material having appropriate strength, such as a resin or resin-impregnated paper. Although the main body 30 was depicted as one integrally molded planar member, a laminate structure may be employed for the main body 30, such that an inlet sheet, on which an antenna or an IC device is provided, is sandwiched between two overlay sheets.

The movement mechanism 40 is a mechanism of altering a distance "d" between the antenna 60 and the metal object 70, and any mechanism may be employed as long as it can alter the distance "d".

The IC device 50 is an electronic component designed to execute a transmission/reception processing function, a storing function, and an input/output control function, and has a function of performing information processing for transmitting/receiving data to/from a reader device (a reader/writer).

The antenna 60 is a device for receiving electromagnetic waves radiated from the reader device via a space, supplying the received waves to the IC device 50 via a space, or sending a signal generated by the IC device 50 to the reader device via a space.

In the example shown in the figure, the antenna 60 is a so called dipole antenna, and is also a flat conductor. However, the antenna 60 is not limitative to such dipole antenna, and another type of antenna, for instance, an antenna coil, may be employed as the antenna 60. The antenna 60 can be regarded as an opposite electrode, for instance, a capacitor (a capacitive element) by positioning it opposite to the metal object 70.

Figure 2:
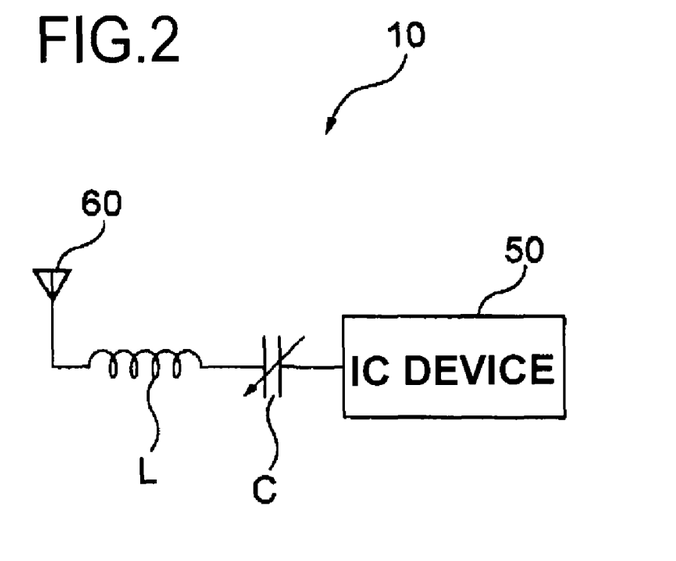
FIG. 2 is a view showing an equivalent circuit of the wireless IC tag of the present invention.

FIG. 2 is an equivalent circuit diagram of the wireless IC tag 10. The antenna 60 and the metal object 70 function as a capacitor and an inductor, respectively, and constitute a so called LC resonator circuit (they may be either of serial and parallel circuits). A resonance frequency F thereof is obtained in the formula below.

$$F = 1/2\pi\sqrt{LC} \quad \text{[Formula 1]}$$

(Wherein L is an inductance of an inductor and C is a capacitance of a capacitor)

In the formula, the capacitance C of the capacitor, which is made up of the antenna 60 and the metal object 70, is obtained in accordance with a relationship that follows:

$$C = \epsilon_o S/d \quad \text{[Formula 2]}$$

(Wherein $\epsilon_o$ is a vacuum dielectric constant, S is an area of the antenna 60, and "d" is a distance between the antenna 60 and the metal object.

Therefore, the resonance frequency F can be varied by altering the distance "d" between the antenna 60 and the metal object 70. The distance "d" between the antenna 60 and the metal object 70 is properly varied so as to obtain a desired resonance frequency, whereby the wireless IC tag 10 that receives radio waves for reading in a plurality of different radio frequencies can be constituted.

[A.2. Movement Mechanism]
[A.2.1. Example in which a Slide Button is Employed]

Figure 3:
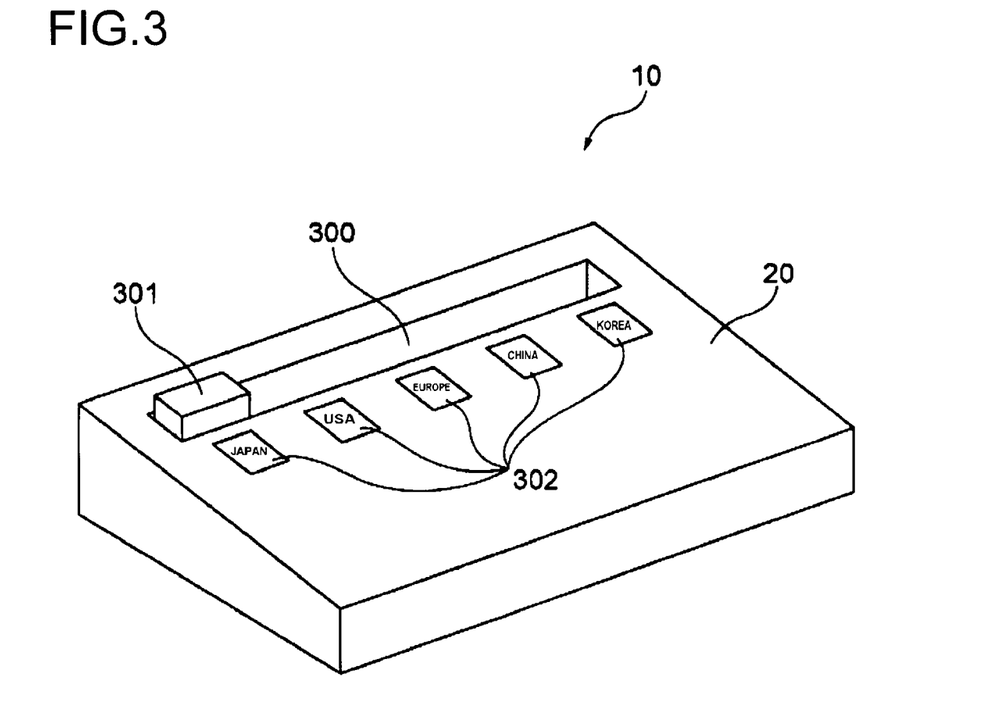
FIG. 3 is an external perspective view of a first example of the wireless IC tag according to the first embodiment of the present invention.

Next, a specific example of the movement mechanism 40 that varies the distance "d" between the antenna 60 and the metal object 70 will be described. FIG. 3 is an external perspective view of the wireless IC tag 10 employing the movement mechanism 40 that employs a slide button (pressing unit; sliding unit), and FIG. 4 is a view showing an internal structure of the wireless IC tag 10 shown in FIG. 3.

As shown in FIG. 3, a slit 300 is formed in a case 20 of the wireless IC tag 10, and a slide button 301 is slidably engaged in the slit 300. An indication 302 for destination countries is provided downwardly of the slit 300; the value of the capacitance C is varied depending upon a position of the slide button 301 by moving the slide button 301 in accordance with this indication 302, and, as the result thereof, the resonance characteristics of the wireless IC tag 10 are varied correspondingly to the indication 302 selected by the slide button 301. In the example shown in the figure, for instance, if the slide button 301 is set to a position of the indication 302 for "Japan", the value of the capacitance C is varied so as to accord with the radio frequency band for reading, that is used in Japan, and the resonance characteristics of the wireless IC tag 10 are varied as the result thereof. If the slide button 301 is set to a position of the indication 302 for "USA", the value of the capacitance C is varied so as to accord with the radio frequency band for reading, that is used in the US, and the resonance characteristics of the wireless IC tag 10 are varied as the result thereof.

Figure 4:
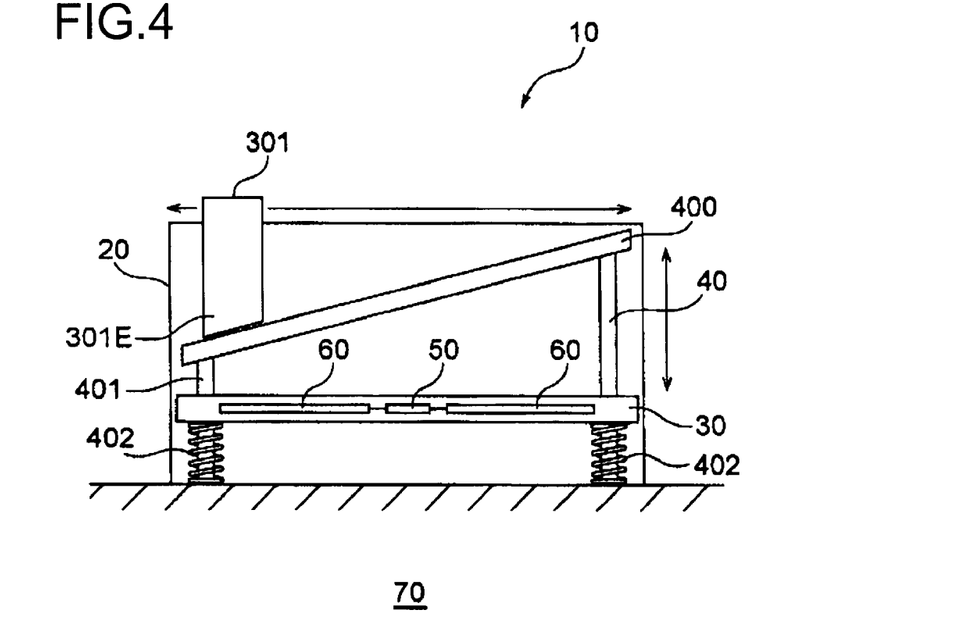
FIG. 4 is an internal structural view of the first example of the wireless IC tag according to the first embodiment of the present invention.

As shown in FIG. 4, the slide button 301 is protrusive in the case 10. An end part 301E of the slide button 301 slidably comes into contact with an inclined cam 400 provided in a state in which the cam is included in the case 10. The inclined cam 400 is mounted to a main body 30 by means of a coupling member 401. Further, a spring (biasing unit) 402 is provided between the main body 30 and a bottom face of the case 10, and the main body 30 is always upwardly biased.

The more leftward in the figure the slide button 301 is positioned, the more deeply the inclined cam 400 is pushed downwardly by the end part 301E, and, as the result thereof, the distance "d" between the antenna 60 and a metal object is reduced, and the resonance frequency F becomes low. Conversely, the more rightward in the figure the slide button 301 is positioned, the more shallowly the inclined cam 400 is pushed downwardly by the end part 301E, and, as the result thereof, the distance "d" between the antenna 60 and the inclined cam 70 increases, and the resonance frequency F becomes high.

A user operates the slide button 301 by positioning the indication 302 in accordance with the radio frequency band for reading, that is used in each of the destination countries, whereby the wireless IC tag 10 can be simply and speedily varied to another one having the resonance characteristics suitable for each of the destination countries, eliminating a need to replace the wireless IC tag 10 with the replacement tag.

[A.2.2. Example in which Select Button is Employed]

Figure 5:
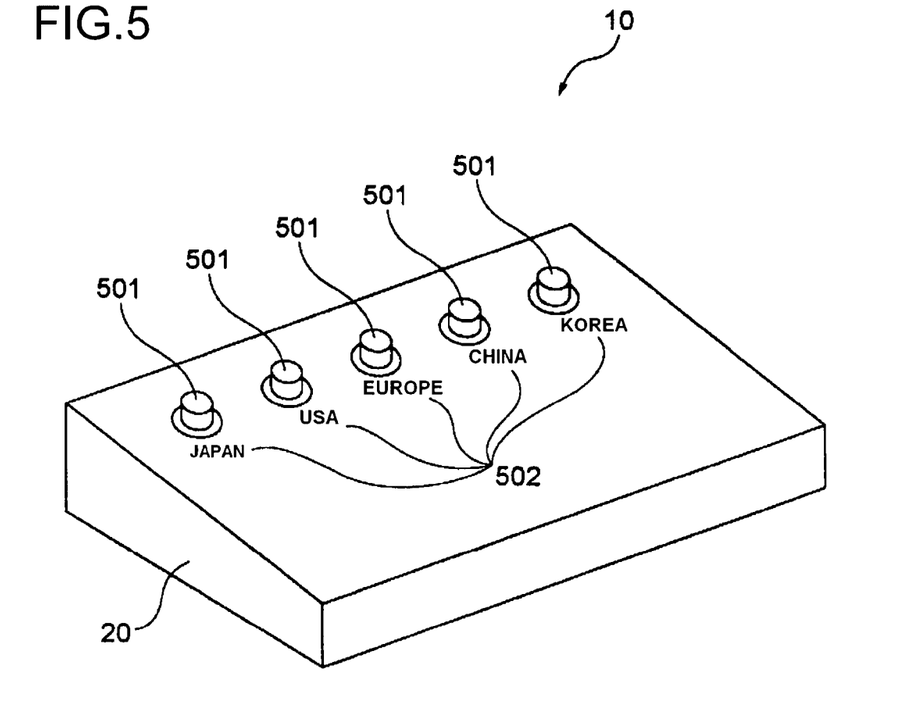
FIG. 5 is an external perspective view of a second example of the wireless IC tag according to the first embodiment of the present invention.

Next, another specific example of the movement mechanism 40 that varies the distance "d" between the antenna 60 and the metal object 70 will be described. FIG. 5 is an external perspective view of the wireless IC tag 10 with the movement mechanism 50 employing a shift button, and FIG. 6 is a view showing an internal structure of the wireless IC tag 10 shown in FIG. 5.

As shown in FIG. 5, in this example, a plurality of select buttons (pushing unit and a pushbutton) 501 for destination countries are provided in the case 20 of the wireless IC tag 10, and these select buttons 501 cannot be depressed simultaneously in plurality. When any one of the select buttons 501 is depressed, the pushed select button 501, which was depressed in advance, is released, and is restored to its original position (a position set before the button is pushed). An indication 502 for destination countries is provided downwardly of the select button 501; by depressing the select button 501 corresponding to this indication 502, the value of the capacitance C is varied; and, as the result thereof, the resonance characteristics of the wireless IC tag 10 are varied correspondingly to the indication 502 selected by the select button 501. In the example shown in the figure, for example, if the select button 501 corresponding to the indication 502 for "Japan" is depressed, the value of the capacitance C is varied so as to accord with the radio frequency band for reading, that is used in Japan, and, as the result thereof, the resonance characteristics of the wireless IC tag 10 are varied. If the select button 501 corresponding to the indication 502 for "US" is depressed, further, the value of the capacitance C is varied so as to accord with the radio frequency band used in the US, and, as the result thereof, the resonance characteristics of the wireless IC tag 10 are varied.

Figure 6:
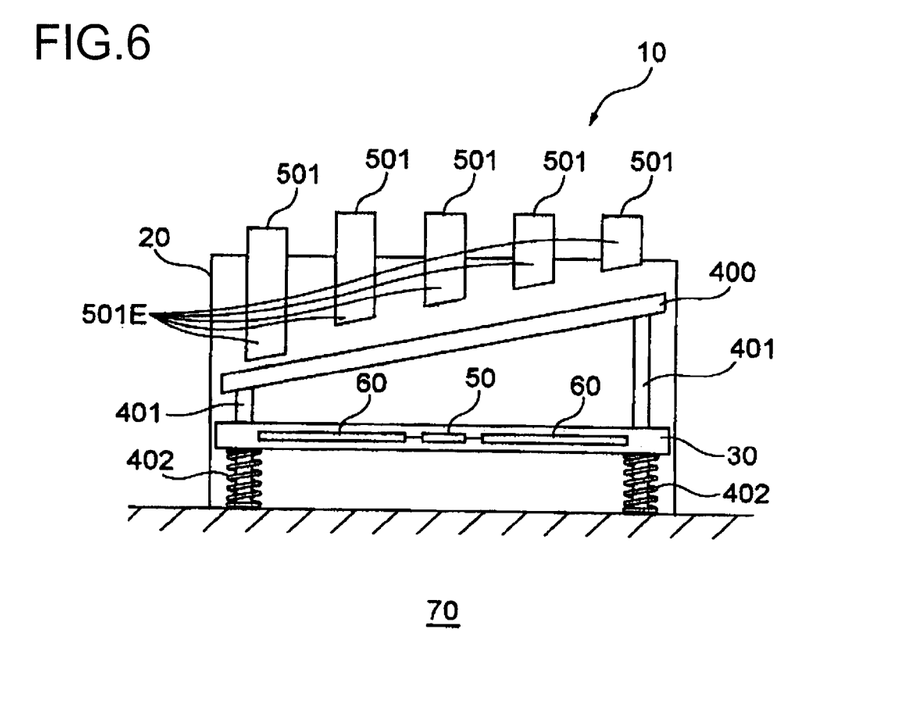
FIG. 6 is an internal structural view of the second example of the wireless IC tag according to the first embodiment of the present invention.

As shown in FIG. 6, each select button 501 has an end part 501E which is protrusive in the case 10. The length of which the end part 501E is protrusive in the case 10 is different depending upon each of the select buttons 501, and the longer end part 501E is protrusive in the case 10, the more deeply the inclined cam 400 can be pushed down. The end part 501E of the select button 501 comes into contact with an inclined cam 400 provided in the case 100. The inclined cam 400, the coupling member 401, the main body 30, and the spring 402 have structures and functions which are similar to those of the examples shown in FIGS. 3 and 4, and thus, a description thereof is omitted here.

The longer end part 501E is protrusive in the case 10 when the select button 501 is depressed, the more deeply the inclined cam 400 is pushed downwardly by the end part 501E, and, as the result thereof, the distance "d" between the antenna 60 and the metal object 70 is reduced, and the resonance frequency F becomes low. Conversely, the shorter the end part 501E is protrusive in the case 10 when the select button 501 is depressed, the more shallowly the inclined cam 400 is pushed downwardly by the end part 501E, and, as the result thereof, the distance "d" between the antenna 60 and the metal object 70 increases, and the resonance frequency F becomes high.

A user depresses any of the select buttons 501 by positioning the indication 502 in accordance with the radio frequency band used in each of the destination countries, whereby the wireless IC tag can be simply and speedily varied to another one having the resonance characteristics suitable for each of the destination countries, and a need to replace the wireless IC tag 10 with the replacement tag does not arise.

[Example in which a Rotary Dial is Employed]

Figure 7:
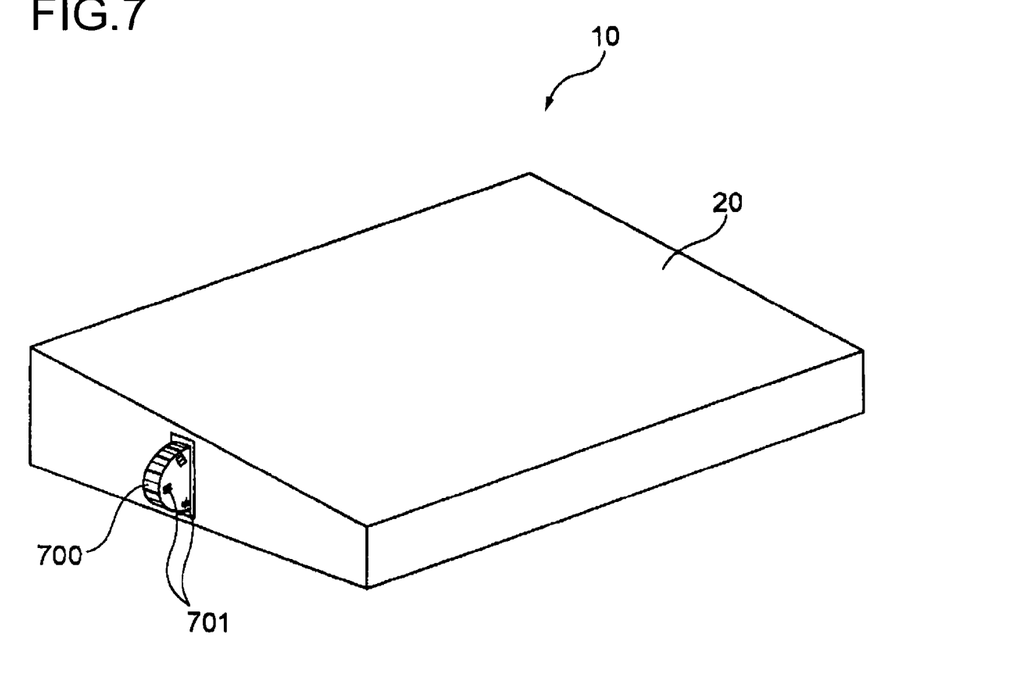
FIG. 7 is an external perspective view of a third example of the wireless IC tag according to the first embodiment of the present invention.

Next, still another specific example of the movement mechanism 40 for altering the distance "d" between the antenna 60 and the metal object 70 will be described. FIG. 7 is an external perspective view of the wireless IC tag with the movement mechanism 40 employing a rotary dial, and FIG. 8 is a view showing an internal structure of the wireless IC tag 10 shown in FIG. 7.

As shown in FIG. 7, in this example, a rotary dial (rotary element) 700 is turnably provided in the case 20 of the wireless IC tag 10. On the surface of the rotary dial 700, an indication 701 for the destination countries is provided. In the example shown in the figure, for instance, if the rotary dial 700 is rotated so that the indication 701 for "Japan" stops at a predetermined position, the value of the capacitance C is varied so as to accord with the radio frequency band for reading, that is used in Japan, and, as the result thereof, the resonance characteristics of the wireless IC tag 10 are varied. Further, if the rotary dial 700 is rotated so that the indication 701 for "US" stops at a predetermined position, the value of the capacitance C is varied so as to accord with the radio frequency band for reading, that is used in the US, and, as the result thereof, the resonance characteristics of the wireless IC tag 10 are varied.

Figure 8:
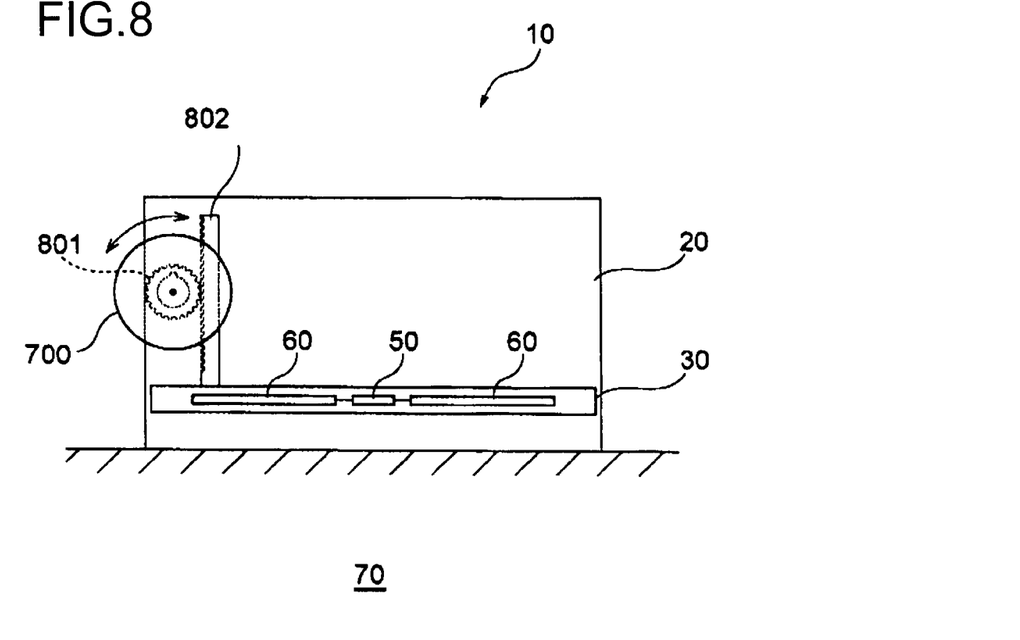
FIG. 8 is an internal structural view of the third example of the wireless IC tag according to the first embodiment of the present invention.

As shown in FIG. 8, a gear 801 is coaxially provided at the rotary dial 700, and the gear 801 is engaged with a rack 802. The rack 802 vertically moves in response to rotation of the gear 801, and one end of the rack 802 is mounted on the main body 30 that is slidably provided in the case 20. The main body 30 vertically moves in the case 20 together with the vertical movement of the rack 802. In other words, the main body 30 vertically moves in the case 20 in response to the rotation of the rotary dial 700.

The more downwardly the rack 802 moves, the shorter distance "d" between the antenna 60 and the metal object 70 is, and the lower resonance frequency F is. Conversely, the more upwardly the rack 802 moves, the longer distance "d" between the antenna 60 and the metal object 70 is, and the higher resonance frequency F is.

By positioning the indication 701 on the rotary dial 700 in accordance with the radio frequency band for reading, that is used in each of the destination countries, a user rotates the rotary dial in accordance with the destination country, whereby the wireless IC tag 10 can be simply and speedily varied to another one having the resonance characteristics suitable for the destination country, and there is no need to replace the wireless IC tag 10 with the replacement tag.

B. Second Embodiment

Next, a second embodiment of the present invention will be described. The second embodiment of the present invention is a readable wireless IC tag even in a plurality of different countries (destination countries) with different radio frequency bands for reading, which is usable even if it is attached to an object other than a metal.

[B.1. Basic Configuration]

Figure 9:
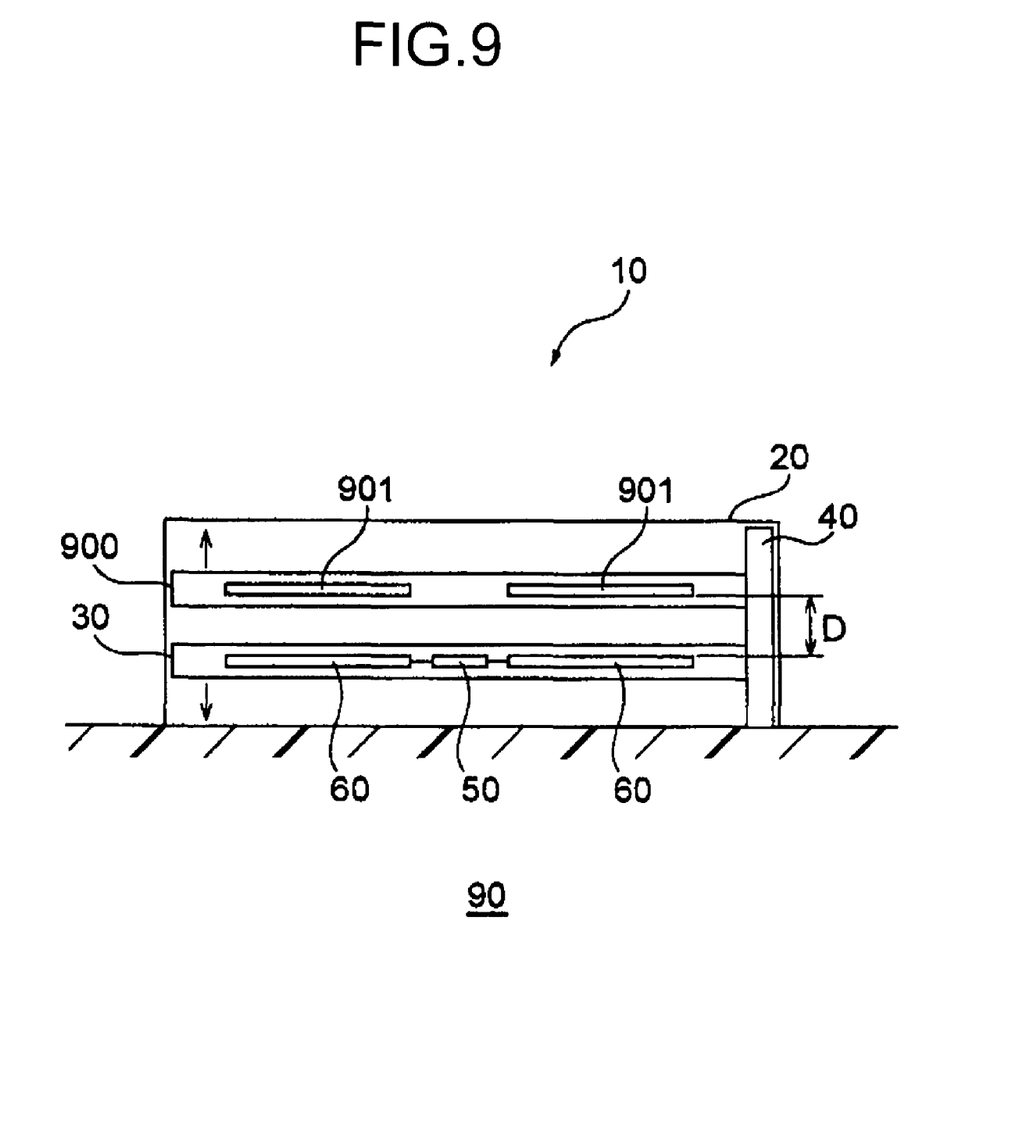
FIG. 9 is a view showing a basic configuration of a wireless IC tag according to a second embodiment.

FIG. 9 is a view showing a basic configuration of the wireless IC tag according to the present embodiment.

The wireless IC is made up of: a case 20 formed in a substantially box-like shape; a main body 30, which is movably provided in a vertical direction (in a substantially vertical direction relative to a mount face) inside of the case 20; a movement mechanism 40 for vertically moving the main body 30 in the case 20; and a metal plate portion 900, which is movably provided in a vertical direction (in a substantially vertical direction relative to a mount face) inside of the case 20. The main body 30 has an IC device 50 and an antenna 60 connected to the IC device 50. The wireless IC tag 10 is attached to an object 90 by means of an adhesive seal, etc., (not shown) so as not to be readily released therefrom.

The case 20, the main body 30, the movement mechanism 40, the IC device 50, and the antenna 60 are identical to those described in the aforementioned first embodiment, and thus, a detailed description thereof is omitted.

The metal plate portion 900 is a platy member having a metal plate (metal object) 901 which is disposed opposite to the antenna 60, the platy member being slidably provided vertically in the case 20 independently of the main body 30. In the embodiment, the antenna 60 and the metal plate 901 function as a capacitor and an inductor, respectively, and constitute a so called LC resonance circuit. The main body 30 and/or the metal plate portion 900 are moved by means of the movement mechanism 40, whereby a distance D between the antenna 60 and the metal plate 901 can be varied by a predetermined quantity, and the resonance frequency F of the wireless IC tag 10 can be altered. In other words, the wireless IC tag 10 that receives radio waves for reading in a plurality of different radio frequency bands can be constituted by appropriately altering the distance D between the antenna 60 and the metal plate 901 to obtain a desired resonance frequency.

As long as at least one of the main body 30 and the metal plate portion 900 is movable, the present embodiment is established, and may employ a configuration, in which the other one is fixed and immobilized.

C. Third Embodiment

Next, a third embodiment of the present invention will be described.

[C.1. Basic Configuration]

Figure 10A:
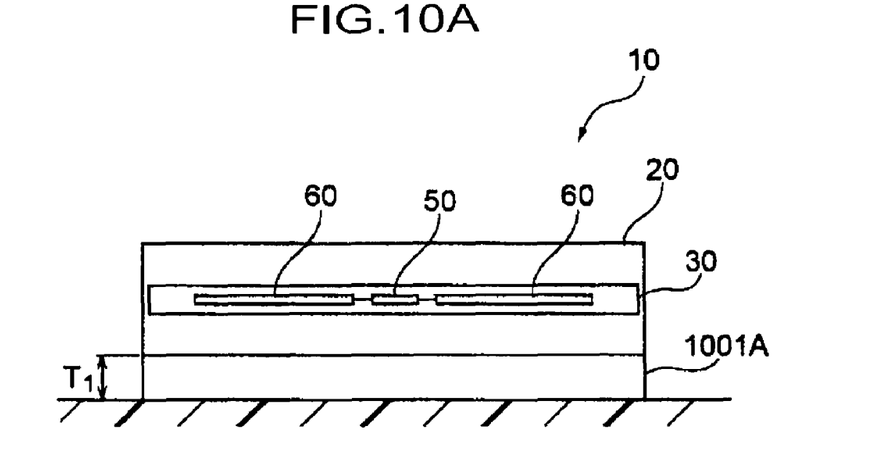
FIG. 10A is a view showing a basic configuration of a wireless IC tag according to a third embodiment of the present invention.

FIG. 10A is a view showing a basic configuration of a wireless IC tag according to the third embodiment of the present invention. The wireless IC tag 10 has: a case 20 formed in a substantially box-like shape; a main body 30, which is provided inside of the case 20; and a metal plate (metal object) 10, which is replaceably mounted on a top face or a bottom face of the case 20. Unlike the first and second embodiments, the main body 30 never moves in the case 20, and therefore, it does not have a movement mechanism 40.

The wireless IC tag 10 has a metal plate 1001A which is replaceably mounted on the top face or the bottom face of the case 20. This metal plate 1001A is replaceable with the replacement plate in accordance with the radio frequency band for reading in each of the destination countries. The material (such as copper, iron, or aluminum) for, and the area, thickness, and shape, etc., of the metal plate 1001A, are determined so that the resonance characteristics of the LC resonance circuit that is made up of the antenna 60 and the metal plate 1001A accord with the radio frequency band for reading in each of the destination countries.

Figure 10B:
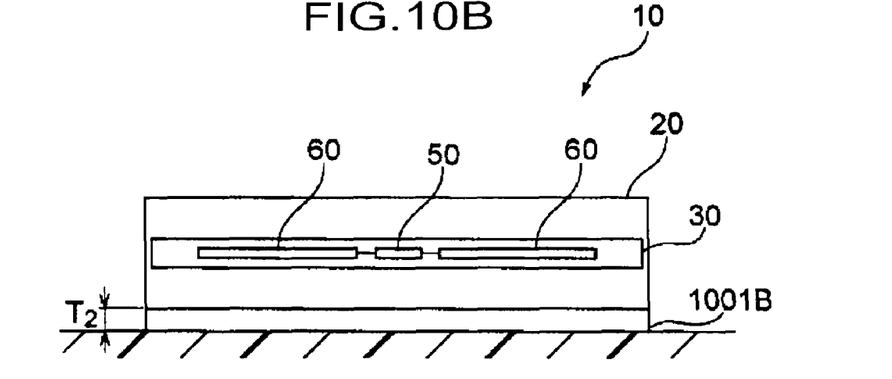
FIG. 10B is a view showing a basic configuration of a wireless IC tag in a state in which the tag is mounted on another metal plate.

FIG. 10B shows a state established after the metal plate 1001A mounted on the wireless IC tag 10 has been replaceably mounted on a thinner metal plate 1001B. In this manner, the wireless IC tag 10 has resonance characteristics which are different from those in the state of FIG. 10A.

Figure 10C:
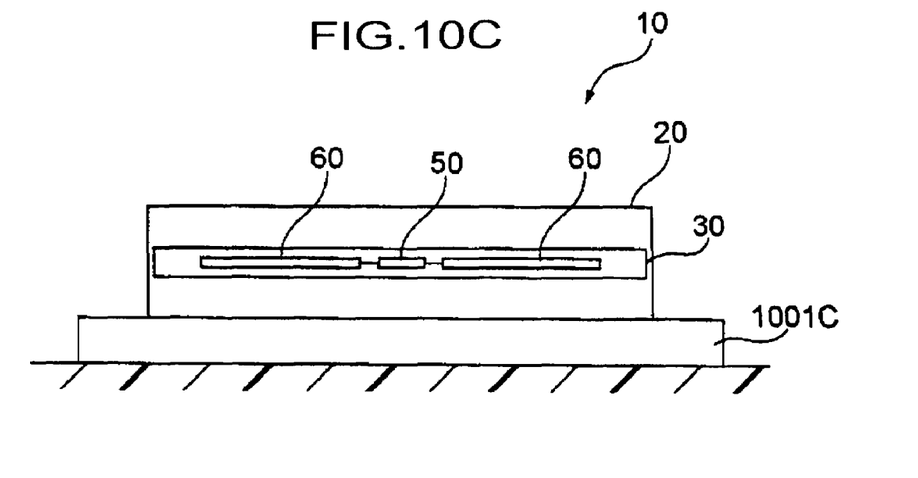
FIG. 10C is a view showing a basic configuration of a wireless IC tag in a state in which the tag is mounted on still another metal plate.

FIG. 10C shows a state established after the metal plate 1001A mounted on the wireless IC tag 10 has been replaceably mounted on a metal plate 1001C of its larger area. In this manner, the wireless IC tag 10 has resonance characteristics which are different from those in the state of FIG. 10A.

In this manner, a plurality of metal plates 1001 of their varied material (such as copper, iron, or aluminum) are provided so as to accord with the radio frequency band for reading in each of the destination countries, and then, are replaceably mounted on a metal plate suitable for such each destination countries, whereby the wireless IC tag 10 can be simply and speedily varied to another one having the resonance characteristics suitable for each of the destination countries, and a need to replace the wireless IC tag 10 with the replacement tag can be eliminated.

The invention claimed is:

1. A wireless IC tag which is readable in a plurality of countries with a plurality of different radio frequency bands for reading and is used in international material distribution management, the wireless IC tag comprising:
   a case;
   an antenna, which is provided in the case and is movable with respect to a metal object opposite to the antenna; and
   distance varying means for varying resonance characteristics of the wireless IC tag by moving the antenna in the case and altering a distance between the metal object and the antenna, wherein
   the wireless IC tag has a plurality of indicators corresponding to the plurality of different frequency bands, respectively, for setting the distance between the metal object and the antenna as a distance corresponding to a respective one of the plurality of different frequency bands,
   the distance between the metal object and the antenna is variable by a user's operation to the distance varying means, and
   resonance characteristics of the wireless IC tag are adjustable in accordance with a radio frequency band used in a destination country by the user's operation to the distance varying means in accordance with a respective one of the indicators that corresponds to the destination country.

2. The wireless IC tag according to claim 1, wherein the case is mounted to the metal object.

3. The wireless IC tag according to claim 1, wherein the metal object is disposed in the case opposite to the antenna.

4. The wireless IC tag according to claim 3, wherein the metal object is movably disposed in the case.

5. The wireless IC tag according to claim 4, wherein the distance varying means alters the resonance characteristics of the wireless IC tag by moving the metal object in the case and altering the distance between the metal object and the antenna.

6. The wireless IC tag according to claim 1, wherein the metal object is replaceably mounted on an external face of the case so as to be opposed to the antenna.

7. The wireless IC tag according to claim 6, wherein plural types of replaceable metal objects exist, and the metal objects are different from one another in at least one of area, thickness, quality of material, and shape so as to obtain resonance characteristics suitable for any one of a plurality of different frequency bands.

8. The wireless IC tag according to claim 1, wherein the antenna is connected to an IC device having functions including at least one of a transmission/reception function, a storing function, and an input/output control function.

9. The wireless IC tag according to claim 8, wherein the IC device is disposed in the case.

10. A wireless IC tag, comprising:
    a case;
    an antenna, which is provided in the case and is movable with respect to a metal object opposite to the antenna; and
    distance varying means for varying resonance characteristics of the wireless IC tag by moving the antenna in the case and varying a distance between the metal object and the antenna, wherein
    the distance varying means varies the distance between the metal object and the antenna so as to obtain resonance characteristics suitable for any of a plurality of different frequency bands in response to a user's operation,
    wherein the distance varying means comprises:
      a retainer, which retains the antenna and is movable opposite to the metal object;
      an inclined cam, which is coupled with the retainer and is disposed in a state in which the cam is inclined in the case;
      a pressing unit for moving the retainer and altering a distance between the antenna and the metal object by applying a pressing force upon the inclined cam at a plurality of positions along the inclined cam; and
      a biasing unit for applying a biasing force against the pressing force on the retainer.

11. The wireless IC tag according to claim 10, wherein the pressing unit is made up of one slide member that slides along the inclined cam.

12. The wireless IC tag according to claim 10, wherein the pressing unit is made up of a plurality of pushbuttons disposed at predetermined intervals along the inclined cam.

13. A wireless IC tag, comprising:

a case;

an antenna, which is provided in the case and is movable with respect to a metal object opposite to the antenna; and distance varying means for varying resonance characteristics of the wireless IC tag by moving the antenna in the case and varying a distance between the metal object and the antenna, wherein the distance varying means varies the distance between the metal object and the antenna so as to obtain resonance characteristics suitable for any of a plurality of different frequency bands in response to a user's operation, wherein the distance varying means comprises:

a retainer, which retains the antenna and is movable opposite to the metal object;

a rack, which is coupled with the retainer; and a rotary element having a gear engaged with the rack.

\* \* \* \* \*